(12) United States Patent
Tenebria

(10) Patent No.: US 9,579,737 B1
(45) Date of Patent: Feb. 28, 2017

(54) METHODS FOR THREADING A CERAMIC WORK PIECE WITH A GRIND WHEEL

(71) Applicant: Myers Precision Grinding Company, Warrensville Heights, OH (US)

(72) Inventor: Joseph Tenebria, Warrensville Heights, OH (US)

(73) Assignee: MYERS PRECISION GRINDING COMPANY, Warrensville Heights, OH (US)

( * ) Notice: Subject to any disclaimer, the term of this patent is extended or adjusted under 35 U.S.C. 154(b) by 6 days.

(21) Appl. No.: 14/921,274

(22) Filed: Oct. 23, 2015

Related U.S. Application Data

(60) Provisional application No. 62/069,639, filed on Oct. 28, 2014.

(51) Int. Cl.
*B23G 1/36* (2006.01)
*B24B 19/00* (2006.01)

(52) U.S. Cl.
CPC .............. *B23G 1/36* (2013.01); *B24B 19/008* (2013.01)

(58) Field of Classification Search
CPC ........... B23G 1/36; B24B 19/00; B24B 19/02; B24B 19/008; B24B 1/00; B24B 7/17; B29D 30/0633
USPC ........................ 451/5, 58, 461, 449, 211, 222
See application file for complete search history.

(56) References Cited

U.S. PATENT DOCUMENTS

| | | | | |
|---|---|---|---|---|
| 1,072,620 A | * | 9/1913 | Klay | B24D 15/00 451/461 |
| 1,471,412 A | * | 10/1923 | Opfel | B24B 21/008 318/10 |
| 2,420,504 A | * | 5/1947 | Stewart | B24B 19/022 125/11.16 |
| 2,726,495 A | * | 12/1955 | Field | B24D 13/08 451/461 |
| 3,850,077 A | * | 11/1974 | Garrett | B23G 1/32 409/76 |
| 4,841,676 A | * | 6/1989 | Barwasser | B24B 9/146 408/27 |
| 4,930,265 A | * | 6/1990 | Belthle | B23G 1/36 451/11 |
| 5,210,980 A | * | 5/1993 | Phillips | B23G 1/38 451/11 |
| 6,328,636 B1 | * | 12/2001 | Yoshimi | B23Q 11/1053 451/443 |
| 6,569,003 B1 | * | 5/2003 | Harlan | B23D 59/04 451/184 |

(Continued)

*Primary Examiner* — George Nguyen
(74) *Attorney, Agent, or Firm* — Pearne & Gordon LLP

(57) ABSTRACT

A vertical mill machine may be configured to facilitate a process of grinding a thread into a work piece. In one example, the method includes securing a fixture onto a planar surface of a vertical mill machine, the fixture being rotatable. The method further includes securing a work piece to the fixture and rotating the work piece about a Y-axis. The method yet further includes positioning a milling axle configured to move about an X-Y-Z-axis adjacent a circumferential surface of the work piece, wherein the milling axle includes a tool and wherein the tool is configured to rotate about the Y-axis. The method further includes rotating the tool about the Y-axis and contacting the tool with the circumferential surface of an exposed end of the work piece. The method yet further includes grinding a thread into the work piece with the tool.

20 Claims, 4 Drawing Sheets

(56) References Cited

U.S. PATENT DOCUMENTS

| | | | | |
|---|---|---|---|---|
| 6,579,155 B1* | 6/2003 | Luderich | ................ | B24B 49/16 |
| | | | | 451/240 |
| 6,773,211 B2* | 8/2004 | Zackrisson | ............ | B23B 51/10 |
| | | | | 407/53 |
| 6,840,722 B1* | 1/2005 | Nonaka | ................ | B23Q 1/5468 |
| | | | | 29/898.042 |
| 7,627,940 B2* | 12/2009 | Amirehteshami | ...... | B23B 41/16 |
| | | | | 29/557 |
| 8,602,698 B2* | 12/2013 | Craig | ...................... | B23B 51/08 |
| | | | | 408/1 R |
| 2003/0047046 A1* | 3/2003 | Havskog | ............. | B23D 77/006 |
| | | | | 83/48 |
| 2003/0049085 A1* | 3/2003 | Pettersson | ................... | B23B 49/02 |
| | | | | 409/132 |
| 2005/0107002 A1* | 5/2005 | Gottschald | ................. | B24B 41/04 |
| | | | | 451/8 |
| 2009/0170402 A1* | 7/2009 | Chang | .................... | B23G 9/009 |
| | | | | 451/5 |

* cited by examiner ively suffer.
METHODS FOR THREADING A CERAMIC WORK PIECE WITH A GRIND WHEEL This application claims the benefit of U.S. provisional application Ser. No. 62/069,639 filed Oct. 28, 2014, the contents of which are incorporated herein in their entirety by reference.

FIELD

The present disclosure relates to a method of using a milling machine to grind a work piece, and more particularly, an improved method for grinding a thread into a rotating ceramic work piece with a grinding wheel configured in a vertical milling machine.

BACKGROUND

The process of creating a thread on a desired work piece can be successfully accomplished by the application of various methods (e.g., threading by way of a lathe machine). Common steel bar stock can be threaded by utilizing a lathe machine and a threading tool. The work piece will be placed into a chuck that both secures the work piece and rotates it. Properly timing the application of the threading tool to the work piece will result in the work piece having material cut out of it, ultimately leaving the work piece with a thread on the outer surface.

When a large "batch" of the same part requires the same process of threading, the application of threading methods commonly known, such as discussed in the example above, may not be adequate, as output time would ultimately suffer. Also, threading specific material, such as ceramics, by methods currently known, may lead to unsatisfactory finishes or parts being out of tolerance. Therefore, there exists a current need for a method of threading ceramic material that will improve efficiency throughout the manufacturing process as well as retaining a satisfactory quality of the material.

SUMMARY

The following presents a simplified summary of the disclosure in order to provide a basic understanding of some example aspects described in the detailed description.

In accordance with a first aspect, a method of grinding a work piece comprises securing a fixture onto a planar surface of a vertical mill machine, the fixture being rotatable. The method further includes securing a work piece to the fixture such that a portion of the work piece is exposed outside of the fixture. The method still further includes rotating the work piece about a Y-axis. The method yet further includes positioning a milling axle configured to move about an X-Y-Z-axis adjacent a circumferential surface of the work piece, wherein the milling axle includes a tool and wherein the tool is configured to rotate about the Y-axis. The method further includes rotating the tool about the Y-axis. The method still further includes contacting the tool with the circumferential surface of an exposed end of the work piece. The method yet further includes grinding a thread into the work piece with the tool.

In one example of the first aspect, the step of grinding includes truing the exposed end of the work piece, wherein a true end is created by traversing the tool in an X-Z-plane across a diameter of the work piece. The step of grinding further includes positioning the tool adjacent the true end of the work piece. The step of grinding still further includes contacting the tool with the circumferential surface of the work piece. The step of grinding yet further includes grinding a desired diameter portion into the work piece, wherein the tool moves in any combination of the X-Y-Z-axis. The step of grinding further includes positioning the tool adjacent the true end of the work piece. The step of grinding still further includes contacting the tool with the circumferential surface of the desired diameter portion of the work piece. The step of grinding yet further includes grinding the desired diameter portion into a thread, wherein the tool moves in any combination of the X-Y-Z-axis.

In another example of the first aspect, the step of truing the exposed end of the work piece includes grinding a shell lock into the work piece.

In yet another example of the first aspect, the step of grinding a shell lock into the work piece occurs simultaneously with the step of truing the exposed end of the work piece.

In still another example of the first aspect, the step of grinding a shell lock into the work piece simultaneously with the step of truing the exposed end of the work piece is carried out with a grinding wheel stack. In one example, the grinding wheel stack includes two grinding wheels. In a further example, the two grinding wheels are separated by a spacing disk. In still a further example, the tool includes a grinding wheel. In yet a further example, the tool includes a diamond grinding wheel stack including two or more grinding wheels.

In another example of the first aspect, the fixture includes a collet and a motor. The motor is housed inside a motor housing. In still another example, the fixture is secured to the planar surface of the vertical mill machine by at least one clamp.

In yet another example of the first aspect, the work piece is composed of a ceramic material. In a further example, the work piece is composed of a green ceramic material. In yet a further example, the method includes firing the ceramic work piece.

In another example of the first aspect, the step of grinding the thread into the work piece is carried out with the use of a computer program that controls the movement of the milling axle. In still another example, the milling axle is controlled by a computer numerical control machine.

In yet another example of the first aspect, the method further includes the step of applying a fluid to the work piece before the step of grinding the thread into the work piece.

In still another example of the first aspect, the milling machine is not equipped with a cutting wheel.

In a further example of the first aspect, the step of grinding a desired diameter portion into the work piece includes grinding a shell lock into the work piece.

In yet another example of the first aspect, the step of grinding a shell lock into the work piece occurs simultaneously with the step of grinding the desired diameter portion into the work piece.

In still a further example of the first aspect, the step of grinding a shell lock into the work piece simultaneously with the step of grinding the desired diameter portion into the work piece is carried out with a grinding wheel stack. The grinding wheel stack comprises two grinding wheels.

The first aspect can be provided alone or in combination with one or any combination of the examples of the first aspect discussed above.

It is to be understood that both the foregoing general description and the following detailed description present embodiments of the present disclosure, and are intended to provide an overview of framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, aspects, and advantages of the present disclosure are better understood when the following detailed description is read with reference to the accompanying drawings, in which.

DETAILED DESCRIPTION

Figure 1:
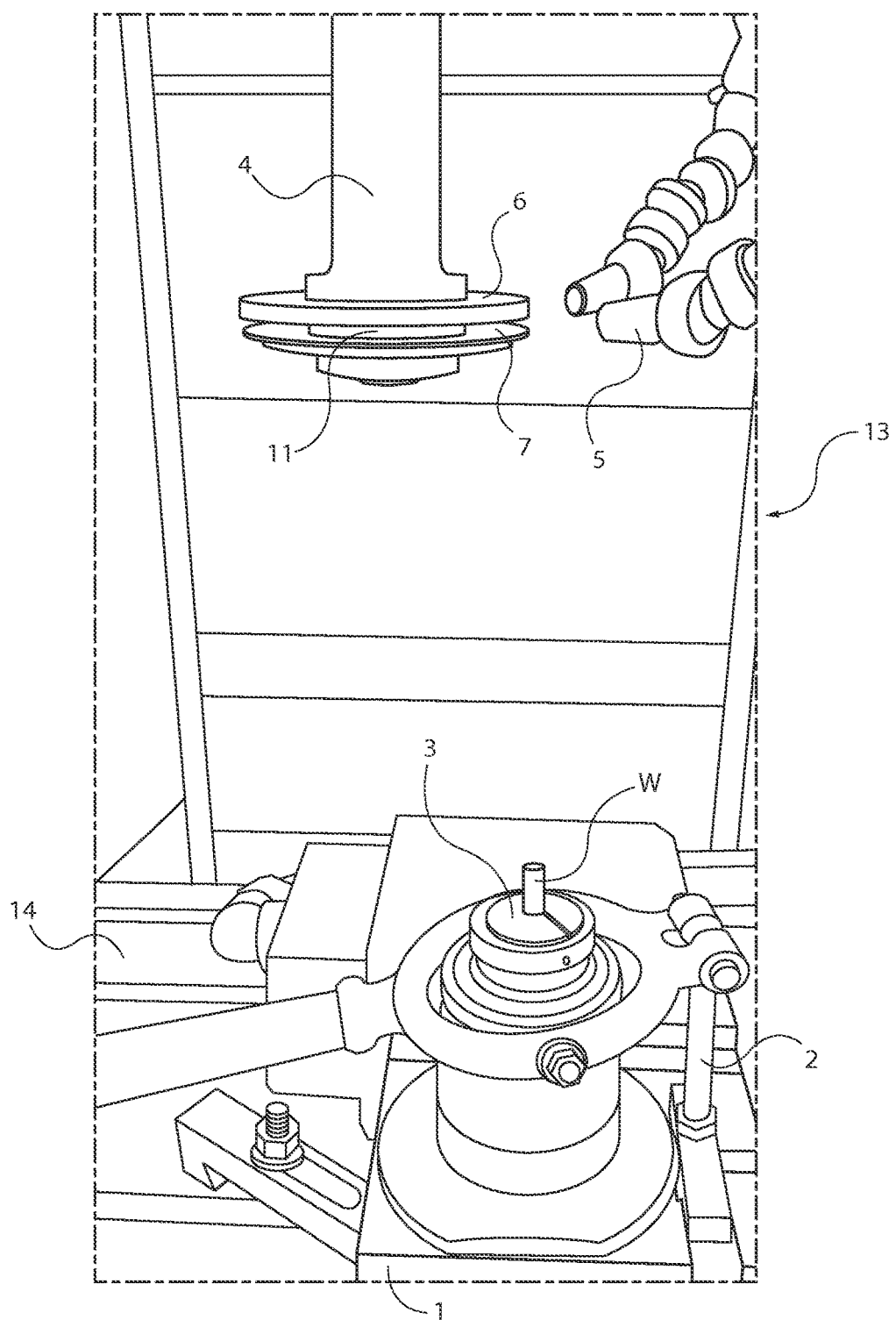
FIG. 1 is a perspective view showing a vertical milling machine configured to grind a work piece.

Methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Herein, when a range such as 5-25 (or 5 to 25) is given, this means preferably at least 5 and, separately and independently, preferably not more than 25. In an example, such a range defines independently not less than 5, and separately and independently, not less than 25.

FIG. 1 is a perspective view of a vertical milling machine 13 configured to grind a thread onto a work piece W. In one example, as shown, the work piece W is in the shape of a cylindrical pin or blank having a circumferential outer surface. In another example, the work piece W could be in a shape other than a cylindrical pin (e.g., cube, cuboid, cone, sphere, etc.). As shown in FIG. 1, the work piece W can be comprised of a ceramic material. The ceramic material can be in an "unfired" or "green" state. In another example, the work piece W may be comprised of a ceramic material that has already been "fired." In further examples, the work piece W may be comprised of materials other than ceramics (e.g., metal, wood, plastic, etc.).

As FIG. 1 illustrates, the vertical milling machine 13 includes a planar surface 14 configured to support the work piece W. The planar surface 14 may be configured to directly support the work piece W. In other examples, as shown, the planar surface 14 may be configured to support a fixture 2, wherein the fixture 2 secures the work piece W. As shown, the fixture includes a collet 3, whereby the collet 3 is configured to secure the workpiece W within the fixture 2. In one example, the collet 3 can be configured to rotate about the Y-axis, which as shown can correspond to the vertical axis of the secured work piece. In other examples, the collet 3 may be stationary (i.e., non-rotatable). The fixture 2 can further include a motor, wherein the motor is configured to rotate the collet 3. In one example, as shown, the motor is housed inside of a motor housing 1. As shown, the motor housing 1 can be in the shape of a cube; however the motor housing 1 can also be in a different shape (e.g., cylinder, cuboid, prism, etc.). In one example, the motor housing 1 may include securing mechanisms configured to secure the fixture 2 to the planar surface 14 of the vertical milling machine 13. In other examples, the motor housing 1 may not include securing mechanisms, thereby at least one securing mechanism, such as a clamp, is necessary to secure the fixture 2 to the planar surface 14 of the vertical milling machine 13. In still further examples, the motor housing 1 is not secured to the planar surface 14 of the vertical milling machine 13, thereby the fixture 2 can be selectively movable throughout processing. In further examples, the motor can be exposed to the environment.

Figure 2:
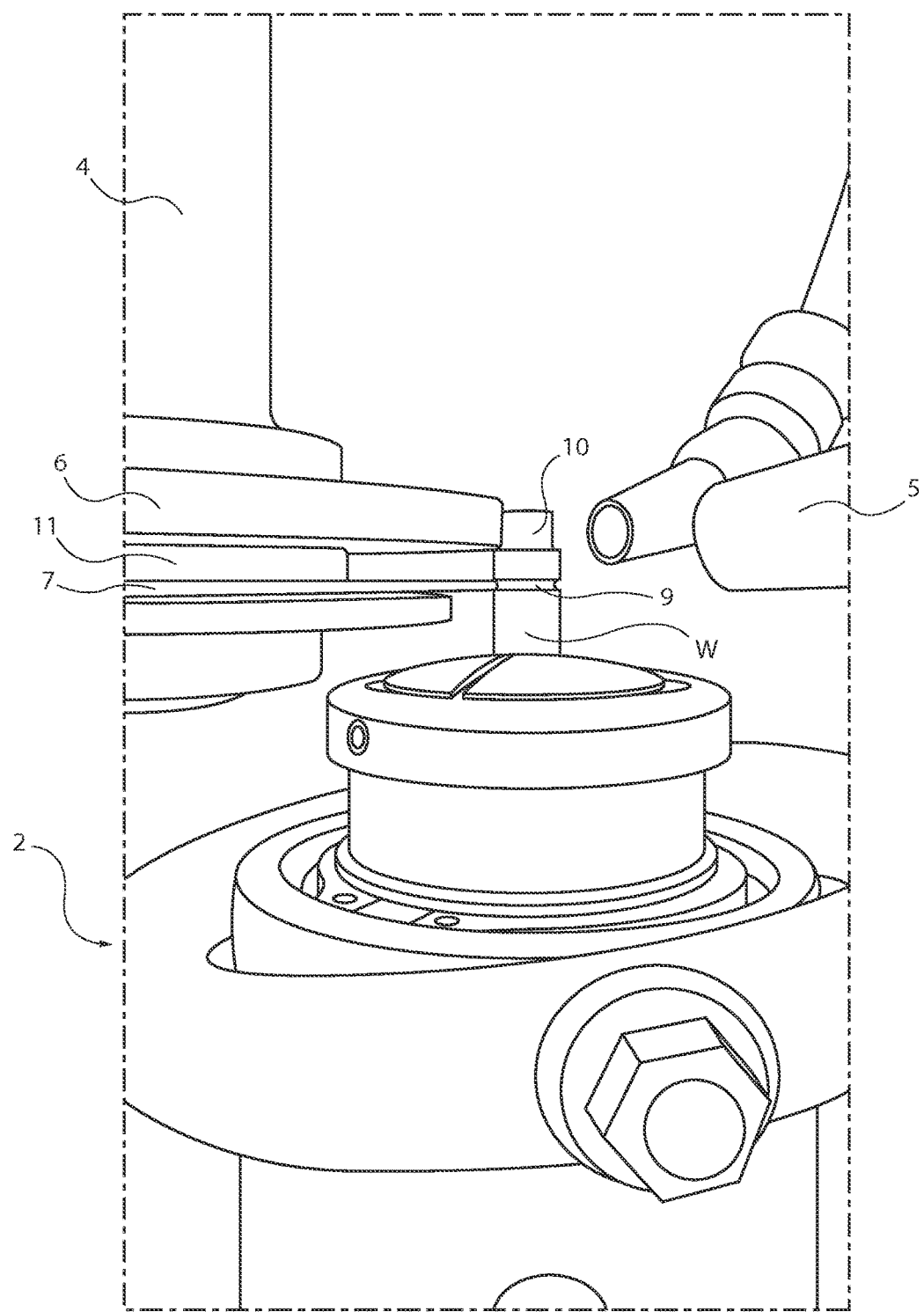
FIG. 2 is a perspective view showing the state of grinding the work piece with grinding wheels.

As shown in FIG. 1, the vertical milling machine 13 is equipped with a milling axle 4, wherein the milling axle 4 includes a tool (e.g., 6, 7). In one example, the milling axle 4 is configured to rotate the tool about the Y-axis. The tool comprises one or more grinding wheels 6, 7. In another example, as shown in FIG. 2, the tool comprises a grinding wheel stack. The grinding wheel stack can comprise two grinding wheels 6, 7, such as a top grinding wheel 6, and a bottom grinding wheel 7 that are separated by a spacing disk 11. The top grinding wheel 6 may have the same, or different, diameter as the bottom grinding wheel 7. In a further example, the grinding wheel stack can comprise two or more grinding wheels. In a still further example, the grinding wheel, whether it be a single grinding wheel, or two or more grinding wheels employed on a grinding wheel stack, may be a diamond grinding wheel. In yet a further example, the tool may be unrelated to grinding. In still another example, the tool does not comprise a cutting wheel configured to cut material off of a work piece.

The grinding wheels have an abrasive surface for contacting the work piece and grinding a collar, thread or the like. The abrasive surface can comprise a grit, for example, bonded to a grinding wheel substrate. The grit can be any suitable material, for example, diamond, aluminum oxide, silicon carbide or mixtures thereof. The grit or abrasive surface can have a coarseness or grit size, for example, in the range of 300 to 1 micron, 200 to 20, or 150 to 50 microns. In another example, the abrasive surface can have a grit size in the range of 16 to 1,000, 36 to 500, 60 to 240, or 80 to 180. The abrasive material and coarseness or grit size can be selected to accommodate the material of the work piece, for example, a diamond abrasive material can be used to grind a ceramic work piece. In one example, the grinding wheel results in grinding a surface of the work piece at a microscopic level, as opposed to a macroscopic level that results from cutting as known in the machining arts. Herein, grinding and cutting are not equivalent as known in the art.

Turning back to FIG. 1, the milling axle 4 may move in any direction defined by the X-Y-Z-axis. The milling axle's 4 movement in the X-Y-Z-axis will now be explained more fully; each defined axis is referenced from a frontal starting position, (i.e., the view illustrated in FIG. 1). From the front of the vertical mill machine 13, as illustrated in FIG. 1, the X-axis is defined as the axis extending from the left side of the machine to the right side of the machine. From the front of the vertical mill machine 13, as depicted in FIG. 1, the Y-axis is defined as the axis extending from the bottom of the machine to the top of the machine. From the front of the vertical mill machine 13, as depicted in FIG. 1, the Z-axis is defined as the axis extending from the front of the machine towards the back of the machine. The milling axle 4 is not limited in its movements and may move in any plane defined by a combination of the axes. In one example, the milling axle's 4 position and movement are controlled by a computer program; for example, the milling axle may be controlled by a computer numerical control [CNC] machine. In other examples, the milling axle 4 may be controlled by a computer program other than a CNC machine.

Methods of grinding a work piece W by way of a vertical mill machine 13 will now be described with reference to the appropriate drawings illustrated in FIGS. 1-4. Moreover, the disclosed order of the method steps are exemplary in nature with the understanding that the steps may be carried out in different orders in further examples.

As shown in FIG. 1, the method includes the step of securing the fixture 2 onto the planar surface 14 of the vertical mill machine 13. As described above, the fixture 2 can be secured to the planar surface 14 of the vertical mill machine 13 by at least one clamp. In another example, the fixture 2 can be secured to the planar surface 14 of the vertical mill machine 13 by a securing mechanism other than a clamp (e.g., a bolt and nut system, etc.).

The method can further include the step of securing the work piece W to the fixture 2 such that a portion of the work piece W is exposed outside of the fixture 2. As discussed above, the fixture 2 can include a collet 3, whereby the collet is configured to secure a portion or end of the work piece W within the fixture 2 such that the portion not secured within the collet extends outward therefrom and forms an exposed portion of the work piece for grinding one or more surface features into the work piece. Such securing measures would be accomplished by gripping forces exerted on the work piece W to ensure immobilization throughout the process. In another example, the fixture 2 can include an alternative securing device (e.g., a chuck, etc.) that would likewise employ a gripping force to immobilize the work piece W.

The method can still further include the step of rotating the work piece W about the Y-axis. As discussed above, the collet 3 of the fixture 2 can be rotatably driven about the Y-axis by a motor. After the work piece W has been secured within the collet 3, and after the motor has been turned on, the collet 3 will experience a rotational motion about the Y-axis at a predetermined speed chosen by the operator. Subsequently, the work piece W will likewise rotate about the Y-axis.

The method can yet further include the step of positioning the milling axle 4 adjacent the circumferential surface of the work piece W, wherein the milling axle 4 includes the tool. In one example, the positioning of the milling axle 4 may be done manually by the operator of the vertical mill machine 13. In another example, the positioning of the milling axle 4 may be carried out by a computer program that controls the movement of the milling axle 4.

The method can still further include the step of rotating the tool about the Y-axis. In one example, the operator of the vertical mill machine 13 may manually switch on the rotational power of the milling axle 4, thereby causing the tool to rotate about the Y-axis. In another example, the rotational power of the milling axle 4 may commence at the command of a computer program that controls the movement of the milling axle 4.

The method can yet further include the step of contacting the tool with the circumferential surface of an exposed end of the work piece W.

The method can still further include the step of grinding a thread into the work piece W with the tool. In one example, the step of grinding can further include the step of truing the exposed end of the work piece W, wherein a true end is created. To create a true end, the tool will make contact with the circumferential surface of the work piece W and will traverse in an X-Z plane across the diameter of the work piece W. In one example, the tool can traverse the entire length of the diameter of the work piece W. In another example, the tool can traverse a different length of the diameter of the work piece W (e.g., more than half the diameter, half the diameter, less than half the diameter). In yet a further example, the step of truing the exposed end of the work piece W can further comprise the step of grinding a shell lock 9 or radius groove into the work piece W. In one example, the step of grinding the shell lock 9 into the work piece W can occur before the step of truing the exposed end of the work piece W. The step of grinding the shell lock 9 into the work piece W can occur after the step of truing the exposed end of the work piece W. In still a further example, the step of grinding the shell lock 9 into the work piece W can occur simultaneously with the step of truing the exposed end of the work piece W; such simultaneous grinding can be achieved by carrying out the operation with a grinding wheel stack containing two grinding wheels.

The step of grinding can still further include the step of positioning the tool adjacent the true end of the work piece W. In yet another example, the step of grinding can yet further include the step of contacting the tool with the circumferential surface of the work piece W. The step of grinding can further include grinding a desired diameter portion into the work piece W.

In one example, as shown in FIG. 2, the milling axle 4 is equipped with a grinding wheel stack comprising a top grinding wheel 6, a bottom grinding wheel 7, and a spacer 11. The step of grinding can further include grinding a desired diameter portion 10 into the work piece W. As shown, the milling axle 4 will position the top grinding wheel 6 against the circumferential surface of the work piece W. The top grinding wheel 6 will make contact with the circumferential surface of the work piece W; at which time, the top grinding wheel 6 will traverse in an X-Z plane across a pre-determined distance of the diameter of the work piece W. In another example, as shown, the step of grinding a desired diameter portion 10 can further include the step of grinding a shell lock 9 or radius groove into the work piece W. As shown in FIG. 2, when the top grinding wheel 6 makes contact with the circumferential surface of the work piece W, the bottom grinding wheel 7 will likewise make contact with the circumferential surface of the work piece W. As the top grinding wheel 6 traverses in an X-Z plane across a pre-determined distance of the diameter of the work piece W to create the desired diameter portion 10, the bottom grinding wheel 7 simultaneously traverses in an X-Z plane across a pre-determined distance of the diameter of the work piece W to create the shell lock 9. In one example, as shown, the diameters of the top grinding wheel 6 and bottom grinding wheel 7 can be the same. In another example, the diameters of the top grinding wheel 6 and bottom grinding wheel 7 can differ.

Figure 3:
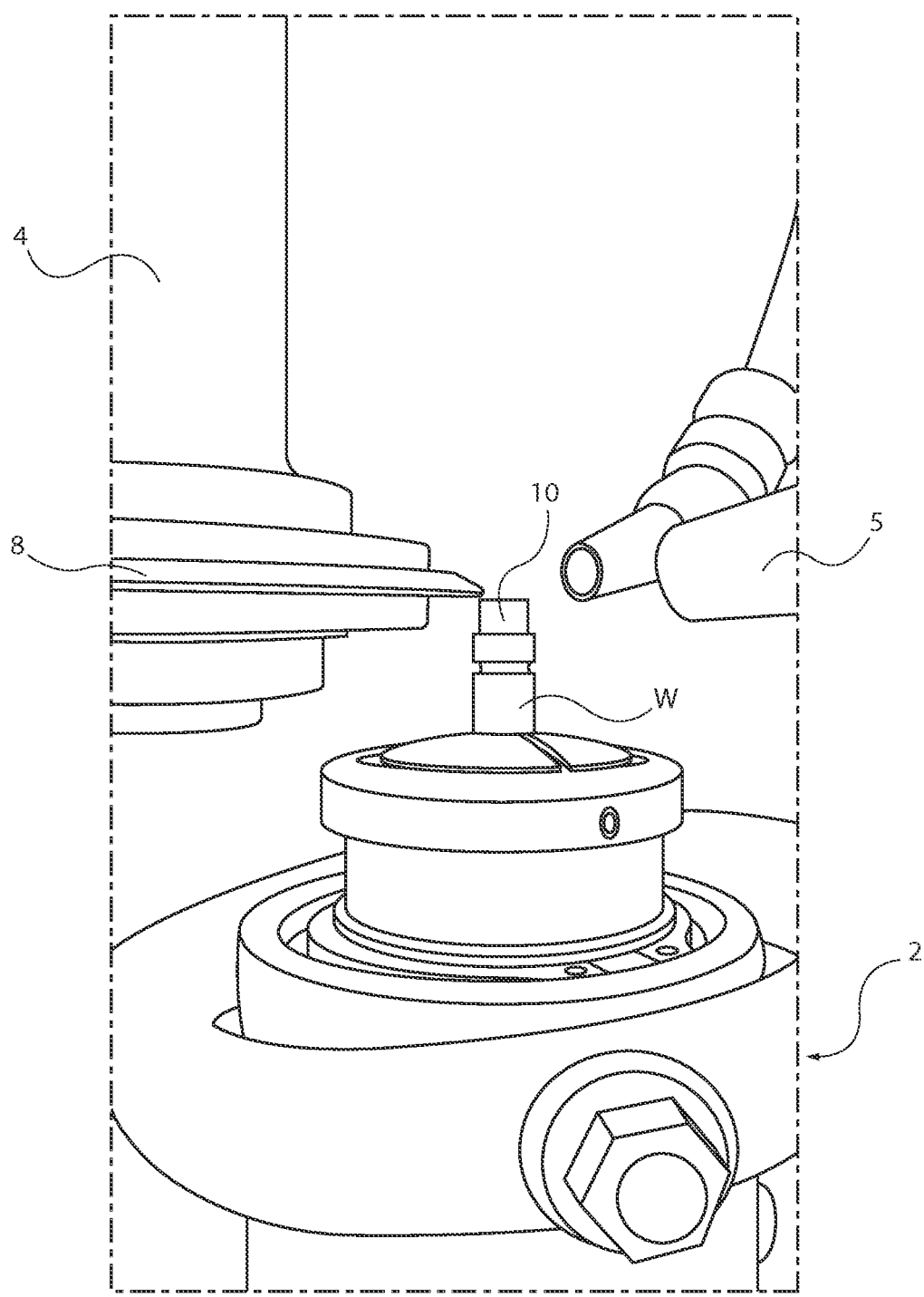
FIG. 3 is a perspective view showing a vertical milling machine configured to grind a thread on a work piece.
Figure 4:
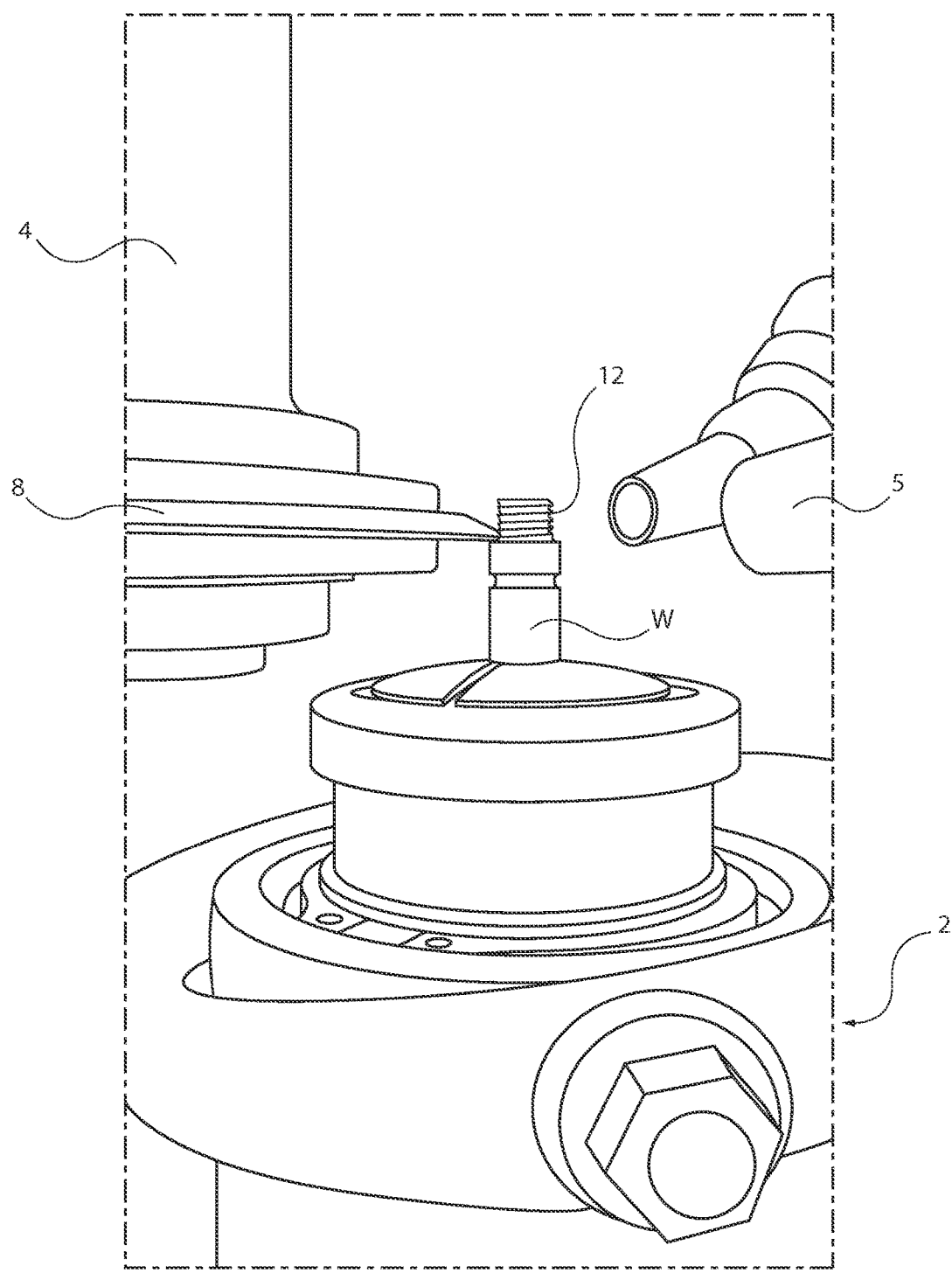
FIG. 4 is a perspective view showing the state of grinding a thread on the work piece.

After the desired diameter portion 10 has been grinded into the work piece W, the step of grinding can further comprise the step of positing the tool adjacent the true end of the work piece W. In one example, as shown in FIG. 3, the tool comprises a single grinding wheel 8. In other examples, the tool can comprise something other than a single grinding wheel (e.g., a grinding wheel stack, a single diamond grinding wheel, a diamond grinding wheel stack, etc.). As shown in FIG. 3, the single grinding wheel 8 contacts the circumferential surface of the desired diameter portion 10 of the work piece W. As shown in FIG. 4, a thread 12 is then ground into the work piece W by moving the single grinding wheel 8 in any combination of the X-Y-Z-axis. In one example, the operator can manually control the movement of the single grinding wheel 8. In other examples, the movement of the single grinding wheel 8 can be controlled by a computer program that controls the movement of the milling axle 4.

In further examples, as shown in FIG. 3, the method for grinding a thread into a work piece can further comprise the step of applying a fluid to the work piece W. The application of fluid can be controlled from a computer program and at least one fluid dispensing unit, such as a fluid nozzle 5. In other examples, the application of fluid can be accomplished by the operator manually employing the fluid nozzle 5. The application or spraying of fluid can be manually accomplished by the operator without a fluid nozzle 5.

In still further examples, the method of grinding a thread into the work piece W can further include the step of firing the work piece W. Such operation may be necessary if the work piece W comprises a green ceramic material.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method for grinding a work piece, the method comprising the steps of:
    securing a fixture onto a planar surface of a vertical mill machine, the fixture being rotatable;
    securing a work piece to the fixture, a portion of the work piece being extending outward from the fixture, the portion of the work piece being exposed outside of the fixture;
    rotating the work piece about a Y-axis;
    positioning a milling axle configured to move about an X-Y-Z-axis adjacent a circumferential surface of an exposed end of the work piece, wherein the milling axle includes a tool and wherein the tool is configured to rotate about the Y-axis;
    rotating the tool about the Y-axis;
    contacting the tool with the circumferential surface of an exposed end of the work piece;
    grinding a thread into the work piece with the tool.

2. The method of claim 1, the step of grinding further comprising the steps of:
    truing the exposed end of the work piece, wherein a true end is created by traversing the tool in an X-Z-plane across a diameter of the work piece;
    positioning the tool adjacent the true end of the work piece;
    contacting the tool with the circumferential surface of the work piece;
    grinding a desired diameter portion into the work piece, wherein the tool moves in any combination of the X-Y-Z-axis;
    positioning the tool adjacent the true end of the work piece;
    contacting the tool with the circumferential surface of the desired diameter portion of the work piece;
    grinding the desired diameter portion into a thread, wherein the tool moves in any combination of the X-Y-Z-axis.

3. The method of claim 2, the step of truing the exposed end of the work piece further comprising the step of grinding a shell lock into the work piece, the shell lock being a predetermined distance away from the thread on the work piece.

4. The method of claim 3, the step of grinding a shell lock into the work piece occurring simultaneously with the step of truing the exposed end of the work piece.

5. The method of claim 4, the step of grinding a shell lock into the work piece simultaneously with the step of truing the exposed end of the work piece being carried out with a grinding wheel stack containing two or more grinding wheels.

6. The method of claim 5, the two or more grinding wheels being separated by a spacing disk.

7. The method of claim 1, the tool being a grinding wheel having an abrasive grinding surface for contacting the circumferential surface of an exposed end of the work piece.

8. The method of claim 1, the tool being a diamond grinding wheel stack comprising two or more grinding wheels.

9. The method of claim 1, the fixture comprising a collet and a motor, and wherein the motor is housed inside a motor housing.

10. The method of claim 1, the fixture being secured to the planar surface of the vertical mill machine by at least one clamp.

11. The method of claim 1, the work piece being a ceramic material.

12. The method of claim 11, the work piece being a green ceramic material.

13. The method of claim 12, further comprising firing the ceramic work piece after grinding the thread into the work piece.

14. The method of claim 1, the step of grinding the thread into the work piece being carried out with the use of a computer program that controls the movement of the milling axle.

15. The method of claim 14, the milling axle being controlled by a computer numerical control machine.

16. The method of claim 1, further comprising the step of applying a fluid to the work piece before the step of grinding the thread into the work piece.

17. The method of claim 1, the milling machine not being equipped with a cutting wheel.

18. The method of claim 2, the step of grinding the desired diameter portion into the work piece further comprising the step of grinding a shell lock into the work piece.

19. The method of claim 18, the step of grinding a shell lock into the work piece occurring simultaneously with the step of grinding a desired diameter portion into the work piece.

20. The method of claim 19, the step of grinding a shell lock into the work piece simultaneously with the step of truing the exposed end of the work piece being carried out with a grinding wheel stack containing two grinding wheels.

* * * * *